(12) United States Patent
Gwidt et al.

(10) Patent No.: US 8,973,429 B2
(45) Date of Patent: Mar. 10, 2015

(54) SYSTEM AND METHOD FOR DETECTING STOCHASTIC PRE-IGNITION

(71) Applicant: GM Global Technology Operations LLC, Detroit, MI (US)

(72) Inventors: J. Michael Gwidt, Brighton, MI (US); Kevin M. Luchansky, Sterling Heights, MI (US); Craig M. Sawdon, Williamston, MI (US); Wajdi B. Hamama, Whitmore Lake, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 118 days.

(21) Appl. No.: 13/775,628

(22) Filed: Feb. 25, 2013

(65) Prior Publication Data

US 2014/0238120 A1 Aug. 28, 2014

(51) Int. Cl.
*G01M 15/12* (2006.01)
*G01M 15/11* (2006.01)

(52) U.S. Cl.
CPC ..................................... *G01M 15/11* (2013.01)
USPC .................... 73/114.07; 73/114.08; 73/114.62

(58) Field of Classification Search
USPC ................ 73/114.07, 114.08, 114.62, 114.63
See application file for complete search history.

(56) References Cited

U.S. PATENT DOCUMENTS

| | | | |
|---|---|---|---|
| 3,923,021 A | 12/1975 | Stark | |
| 4,233,943 A | 11/1980 | Rogora et al. | |
| 4,525,781 A | 6/1985 | Konomi et al. | |
| 4,658,787 A | 4/1987 | Takizawa | |
| 4,691,677 A | 9/1987 | Hotate et al. | |
| 4,760,825 A | 8/1988 | Morita | |
| 4,763,264 A | 8/1988 | Okuno et al. | |
| 4,788,942 A | 12/1988 | Pouring et al. | |
| 4,915,076 A | 4/1990 | Takizawa | |
| 4,919,096 A | 4/1990 | Manaka et al. | |
| 5,046,468 A | 9/1991 | Erhard | |
| 5,074,810 A | 12/1991 | Hobbs et al. | |
| 5,107,813 A | 4/1992 | Inoue et al. | |
| 5,110,310 A | 5/1992 | Hobbs | |
| 5,229,945 A | 7/1993 | Demizu et al. | |
| 5,408,863 A * | 4/1995 | Sawyers et al. | 73/35.05 |
| 5,477,826 A | 12/1995 | Hara et al. | |

(Continued)

FOREIGN PATENT DOCUMENTS

CN 1204003 A 1/1999
CN 101074634 A 11/2007

(Continued)

OTHER PUBLICATIONS

U.S. Appl. No. 13/590,351, Betz.

(Continued)

*Primary Examiner* — Eric S McCall (57) ABSTRACT

A system according to the principles of the present disclosure includes a vibration intensity module and a stochastic pre-ignition (SPI) detection module. The vibration intensity module determines a vibration intensity of an engine over a first engine cycle and a second engine cycle. The first engine cycle and the second engine cycle each correspond to a predetermined amount of crankshaft rotation. The SPI detection module selectively detects stochastic pre-ignition when the vibration intensity of the first engine cycle is less than a first threshold and the vibration intensity of the second engine cycle is greater than a second threshold.

20 Claims, 4 Drawing Sheets

(56) References Cited

U.S. PATENT DOCUMENTS

| | | | |
|---|---|---|---|
| 5,632,247 A | 5/1997 | Hashizume et al. | |
| 5,699,253 A | 12/1997 | Puskorius et al. | |
| 5,700,171 A | 12/1997 | Horton | |
| 5,715,794 A | 2/1998 | Nakamura et al. | |
| 5,732,382 A | 3/1998 | Puskorius et al. | |
| 5,751,147 A | 5/1998 | Nakata et al. | |
| 5,765,528 A | 6/1998 | Kamimaru | |
| 5,771,482 A | 6/1998 | Rizzoni | |
| 5,905,193 A * | 5/1999 | Hashizume et al. | 73/35.09 |
| 6,023,651 A | 2/2000 | Nakayama et al. | |
| 6,085,143 A | 7/2000 | Przymusinski et al. | |
| 6,109,986 A | 8/2000 | Gaynor et al. | |
| 6,415,656 B1 | 7/2002 | Bidner et al. | |
| 6,485,341 B1 | 11/2002 | Lanyi et al. | |
| 6,668,812 B2 | 12/2003 | Javaherian | |
| 6,672,282 B2 | 1/2004 | Harrison et al. | |
| 6,691,653 B2 | 2/2004 | Denz | |
| 6,752,009 B2 | 6/2004 | Minich et al. | |
| 6,757,606 B1 | 6/2004 | Gonring | |
| 6,758,179 B1 | 7/2004 | McKay et al. | |
| 6,866,024 B2 | 3/2005 | Rizzoni et al. | |
| 6,999,868 B2 | 2/2006 | Funke et al. | |
| 7,024,304 B2 | 4/2006 | Fukasawa et al. | |
| 7,047,125 B1 | 5/2006 | He et al. | |
| 7,063,057 B1 | 6/2006 | Waters et al. | |
| 7,117,080 B2 | 10/2006 | Sobel | |
| 7,133,766 B2 | 11/2006 | Kokubo | |
| 7,178,503 B1 | 2/2007 | Brehob | |
| 7,197,916 B2 | 4/2007 | Matsumoto et al. | |
| 7,214,110 B1 | 5/2007 | Ehlers et al. | |
| 7,246,583 B2 | 7/2007 | Cinpinski et al. | |
| 7,251,557 B2 | 7/2007 | Strom et al. | |
| 7,325,446 B1 | 2/2008 | Assaf et al. | |
| 7,353,803 B2 | 4/2008 | Mathews et al. | |
| 7,361,067 B1 | 4/2008 | Smedema | |
| 7,437,233 B2 | 10/2008 | Yasui et al. | |
| 7,451,739 B2 | 11/2008 | Yasui et al. | |
| 7,469,678 B2 | 12/2008 | Ruiz | |
| 7,500,470 B2 | 3/2009 | Buslepp et al. | |
| 7,526,943 B2 | 5/2009 | Cubr et al. | 73/35.09 |
| 7,530,261 B2 | 5/2009 | Walters | |
| 7,607,415 B2 | 10/2009 | Mathews et al. | |
| 7,623,955 B1 | 11/2009 | Rackmil et al. | |
| 7,654,248 B2 | 2/2010 | Buslepp et al. | |
| 7,665,558 B2 | 2/2010 | Akimoto et al. | |
| 7,685,996 B2 | 3/2010 | Brehob | |
| 7,698,935 B2 | 4/2010 | Dibble et al. | |
| 7,784,443 B2 | 8/2010 | Hitomi et al. | |
| 7,861,689 B2 | 1/2011 | Haug et al. | |
| 7,877,174 B2 | 1/2011 | Walser et al. | |
| 7,918,212 B2 | 4/2011 | Verdejo et al. | |
| 8,027,782 B2 | 9/2011 | Assaf et al. | |
| 8,176,896 B2 | 5/2012 | Verdejo et al. | |
| 8,245,692 B2 | 8/2012 | Glugla et al. | |
| 8,251,043 B2 | 8/2012 | Smith | |
| 8,261,603 B2 | 9/2012 | Kondo et al. | |
| 8,307,808 B2 | 11/2012 | Kaiser et al. | |
| 8,387,384 B2 | 3/2013 | Quigley et al. | |
| 8,392,096 B2 | 3/2013 | Mathews et al. | |
| 8,478,511 B2 * | 7/2013 | Hamama et al. | 701/111 |
| 8,532,908 B2 | 9/2013 | Morgan et al. | |
| 8,612,124 B2 | 12/2013 | Verdejo et al. | |
| 2002/0157639 A1 | 10/2002 | Kidokoro et al. | |
| 2004/0153286 A1 | 8/2004 | Yamada | |
| 2004/0236496 A1 | 11/2004 | Sobel | |
| 2005/0039721 A1 | 2/2005 | Truscott et al. | |
| 2005/0056240 A1 | 3/2005 | Sugiyama et al. | |
| 2005/0121005 A1 | 6/2005 | Edwards | |
| 2005/0204805 A1 | 9/2005 | Wakahara et al. | |
| 2006/0112933 A1 | 6/2006 | Yasui et al. | |
| 2006/0124107 A1 | 6/2006 | Sauler et al. | |
| 2006/0241848 A1 | 10/2006 | Strom et al. | |
| 2006/0254560 A1 | 11/2006 | Mann et al. | |
| 2006/0293827 A1 | 12/2006 | Frauenkron et al. | |
| 2007/0068474 A1 | 3/2007 | Cinpinski et al. | |
| 2007/0233430 A1 | 10/2007 | Singh | |
| 2007/0239343 A1 | 10/2007 | Okubo et al. | |
| 2007/0295290 A1 | 12/2007 | Cao | |
| 2008/0006244 A1 | 1/2008 | Asano et al. | |
| 2008/0028387 A1 | 1/2008 | Nakagawa et al. | |
| 2008/0077307 A1 | 3/2008 | Wiles | |
| 2008/0178844 A1 | 7/2008 | Naegele et al. | |
| 2008/0183367 A1 | 7/2008 | Kapus et al. | |
| 2008/0283025 A1 | 11/2008 | Sato | |
| 2008/0312810 A1 | 12/2008 | Nonoyama | |
| 2009/0048729 A1 | 2/2009 | Waters et al. | |
| 2009/0090106 A1 | 4/2009 | Muller | |
| 2009/0192693 A1 | 7/2009 | Bottcher et al. | |
| 2009/0215331 A1 | 8/2009 | Suzuki et al. | |
| 2009/0223495 A1 | 9/2009 | Ohata et al. | |
| 2009/0229568 A1 | 9/2009 | Nakagawa | |
| 2009/0276142 A1 | 11/2009 | Leone et al. | |
| 2009/0276143 A1 | 11/2009 | Rackmil et al. | |
| 2009/0276147 A1 | 11/2009 | Hamama et al. | |
| 2010/0012079 A1 | 1/2010 | Nakazono et al. | |
| 2010/0037859 A1 | 2/2010 | Mashiki | |
| 2010/0063712 A1 | 3/2010 | Bromberg et al. | |
| 2010/0083936 A1 | 4/2010 | Verdejo et al. | |
| 2010/0088010 A1 | 4/2010 | Verdejo et al. | |
| 2010/0089361 A1 | 4/2010 | Inada et al. | |
| 2010/0094528 A1 | 4/2010 | Auclair et al. | |
| 2010/0152790 A1 | 6/2010 | Bjernetun et al. | |
| 2010/0152991 A1 | 6/2010 | Suzuki | |
| 2010/0192905 A1 | 8/2010 | Lewis et al. | |
| 2010/0294027 A1 | 11/2010 | Kondo et al. | |
| 2011/0067396 A1 | 3/2011 | Quigley et al. | |
| 2011/0139120 A1 | 6/2011 | Rollinger et al. | |
| 2011/0224882 A1 | 9/2011 | Makino et al. | |
| 2011/0246049 A1 * | 10/2011 | Matsuo et al. | 701/111 |
| 2011/0253100 A1 | 10/2011 | Kaiser et al. | |
| 2011/0265761 A1 | 11/2011 | Amann et al. | |
| 2011/0283972 A1 | 11/2011 | Wermuth et al. | |
| 2012/0048234 A1 * | 3/2012 | Hamama et al. | 123/436 |
| 2012/0078485 A1 | 3/2012 | Verdejo et al. | |
| 2012/0191275 A1 | 7/2012 | Clever et al. | |
| 2012/0191276 A1 | 7/2012 | Clever et al. | |
| 2012/0191277 A1 | 7/2012 | Clever et al. | |
| 2012/0209494 A1 | 8/2012 | Verdejo et al. | |
| 2013/0047956 A1 | 2/2013 | Davis | |
| 2013/0054109 A1 | 2/2013 | Buslepp et al. | |

FOREIGN PATENT DOCUMENTS

| | | |
|---|---|---|
| CN | 101331305 A | 12/2008 |
| DE | 102009008247 B | 8/2010 |
| JP | 2009174397 A | 8/2009 |
| JP | 2009275663 A | 11/2009 |

OTHER PUBLICATIONS

U.S. Appl. No. 13/590,369, Betz.
Chinese Search Report dated Sep. 27, 2012 for Chinese Application No. CN201110097845.3, (2 pages).
Tim Gilles; Automobile Service; Inspection, Maintenance, and Repair; Jun. 12, 2003; Delmar Learning; Second Edition; p. 560.
O'Reilly Auto Parts; Possible Cause of Engine Misfire: http://oreillyauto.com/site/app/newsfeed/detail?article=800649141; Nov. 23, 2011.

* cited by examiner

SYSTEM AND METHOD FOR DETECTING STOCHASTIC PRE-IGNITION

FIELD

The present disclosure relates to internal combustion engines, and more specifically, to systems and methods for detecting stochastic pre-ignition.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust an air and fuel mixture within cylinders to drive pistons, which produces drive torque. Airflow into the engine is regulated via a throttle. More specifically, the throttle adjusts throttle area, which increases or decreases airflow into the engine. As the throttle area increases, the airflow into the engine increases. A fuel control system adjusts the rate that fuel is injected to provide a desired air/fuel mixture to the cylinders and/or to achieve a desired torque output. Increasing the amount of air and fuel provided to the cylinders increases the torque output of the engine.

In spark-ignition engines, spark initiates combustion of an air/fuel mixture provided to the cylinders. In compression-ignition engines, compression in the cylinders combusts the air/fuel mixture provided to the cylinders. Spark timing and air flow may be the primary mechanisms for adjusting the torque output of spark-ignition engines, while fuel flow may be the primary mechanism for adjusting the torque output of compression-ignition engines.

Boosted engines include a boost device, such as a turbocharger or a supercharger, which provides pressurized air to an intake manifold of an engine. The pressurized air increases the compression ratio of the engine, which increases the torque output of the engine for a given amount of air and fuel provided to the cylinders. In this regard, a boost device may be used to increase the torque output of an engine and/or to improve the fuel economy of an engine.

Pre-ignition occurs in spark-ignition engines when an air/fuel mixture in a cylinder is ignited by an ignition source other than spark. Pre-ignition may cause noise and engine damage, and may even lead to engine failure. Regular pre-ignition occurs in one or more cylinders on a periodic basis (e.g., once per engine cycle). Stochastic pre-ignition occurs at random. Regular pre-ignition may repeatedly occur under certain engine operating conditions, while stochastic pre-ignition may be less repeatable.

SUMMARY

A system according to the principles of the present disclosure includes a vibration intensity module and a stochastic pre-ignition (SPI) detection module. The vibration intensity module determines a vibration intensity of an engine over a first engine cycle and a second engine cycle. The first engine cycle and the second engine cycle each correspond to a predetermined amount of crankshaft rotation. The SPI detection module selectively detects stochastic pre-ignition when the vibration intensity of the first engine cycle is less than a first threshold and the vibration intensity of the second engine cycle is greater than a second threshold.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Stochastic pre-ignition typically occurs in a boosted engine such as a turbo-charged, spark-ignition direct injection engine. Oil and fuel may enter a cylinder of a boosted engine through mechanisms other than a fuel injector due to a high compression ratio of the engine. For example, oil may enter a cylinder of a boosted engine through a positive crankcase ventilation valve, through an intake manifold, and/or between rings of a piston and walls of the cylinder. Stochastic pre-ignition may occur when the oil and fuel auto-ignites.

In the next engine cycle, the air/fuel mixture in the cylinder is typically cooler since there is less unburned oil and fuel in the cylinder and therefore stochastic pre-ignition may not occur. However, in the third engine cycle, additional oil and fuel may accumulate in the cylinder, and therefore stochastic pre-ignition may occur once again. Stochastic pre-ignition may continue to occur in this alternating pattern, yielding engine vibrations that alternate between a low intensity and a high intensity.

A system and method according to the present disclosure detects stochastic pre-ignition based on input from a vibration sensor, such as a knock sensor, that detects vibration in an engine block. A vibration intensity is determined for each engine cycle (e.g., 720 degrees of crankshaft rotation). Stochastic pre-ignition may be detected when the vibration intensity repeats a pattern of alternating between a low intensity (e.g., an intensity of normal combustion) and a high intensity (e.g., an intensity of knock) a predetermined number of times (e.g., 2 times). In addition, stochastic pre-ignition may be detected when the vibration intensity is very high (e.g., 3 to 5 times the intensity of knock) for a single engine cycle.

Figure 1:
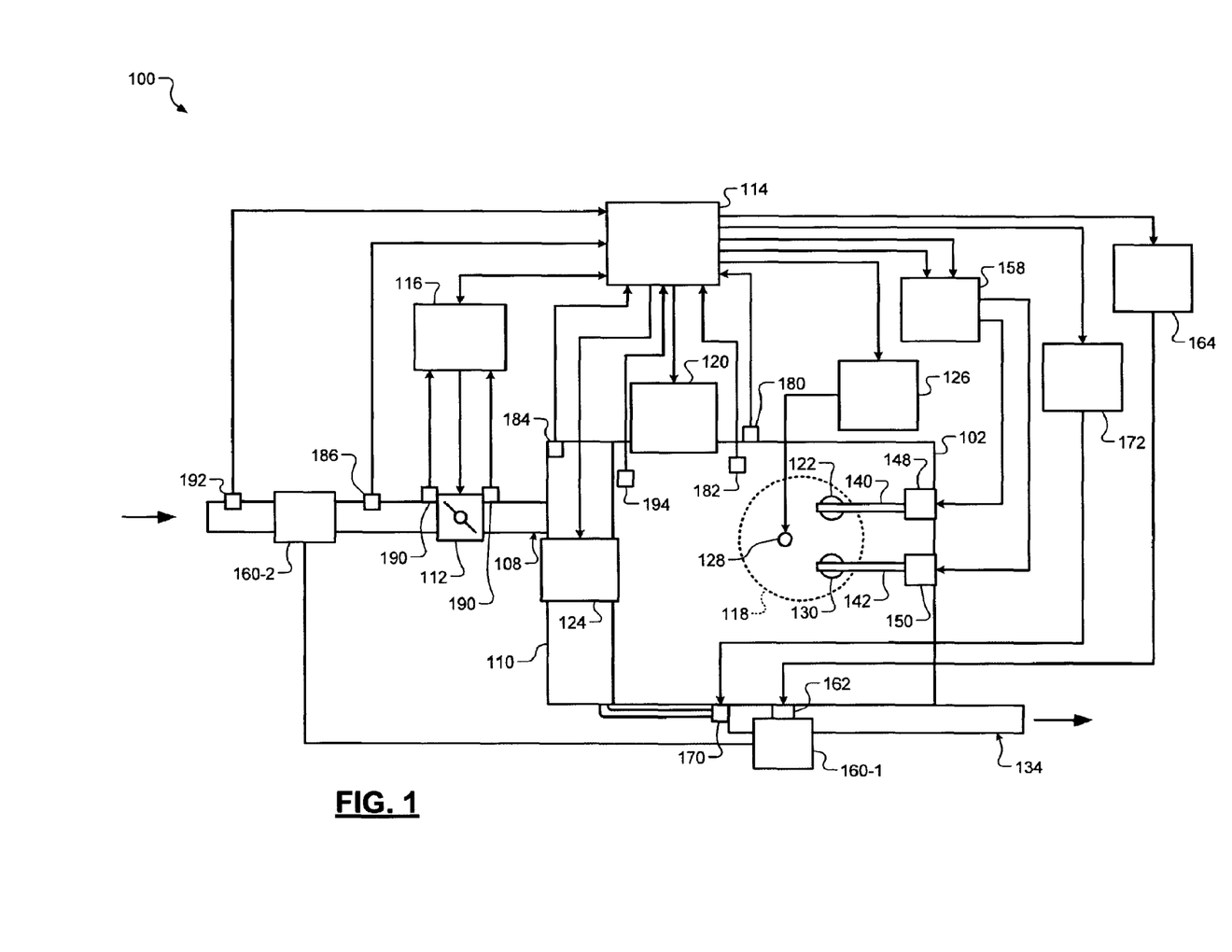
FIG. 1 is a functional block diagram of an example engine system according to the principles of the present disclosure.

Referring to FIG. 1, an example engine system 100 includes an engine 102 that combusts an air/fuel mixture to produce drive torque for a vehicle based on driver input. Air is drawn into the engine 102 through an intake system 108. The intake system 108 includes an intake manifold 110 and a throttle valve 112. The throttle valve 112 may include a butterfly valve having a rotatable blade. An engine control module (ECM) 114 controls a throttle actuator module 116, which regulates opening of the throttle valve 112 to control the amount of air drawn into the intake manifold 110.

Air from the intake manifold 110 is drawn into cylinders of the engine 102. While the engine 102 may include multiple cylinders, for illustration purposes a single representative cylinder 118 is shown. For example only, the engine 102 may include 2, 3, 4, 5, 6, 8, 10, and/or 12 cylinders. The ECM 114 may instruct a cylinder actuator module 120 to selectively deactivate some of the cylinders, which may improve fuel economy under certain engine operating conditions.

The engine 102 may operate using a four-stroke cycle. The four strokes, described below, are named the intake stroke, the compression stroke, the combustion stroke, and the exhaust stroke. During each revolution of a crankshaft (not shown), two of the four strokes occur within the cylinder 118. Therefore, two crankshaft revolutions are necessary for the cylinder 118 to experience all four of the strokes.

During the intake stroke, air from the intake manifold 110 is drawn into the cylinder 118 through an intake valve 122. The ECM 114 controls a fuel actuator module 124, which regulates fuel injection to achieve a desired air/fuel ratio. Fuel may be injected into the intake manifold 110 at a central location or at multiple locations, such as near the intake valve 122 of each of the cylinders. In various implementations, fuel may be injected directly into the cylinders or into mixing chambers associated with the cylinders. In this regard, the engine 102 may be a spark-ignition direct injection engine. The fuel actuator module 124 may halt injection of fuel to cylinders that are deactivated.

The injected fuel mixes with air and creates an air/fuel mixture in the cylinder 118. During the compression stroke, a piston (not shown) within the cylinder 118 compresses the air/fuel mixture. The engine 102 is depicted as a spark-ignition engine. A spark actuator module 126 energizes a spark plug 128 in the cylinder 118 based on a signal from the ECM 114, which ignites the air/fuel mixture. The timing of the spark may be specified relative to the time when the piston is at its topmost position, referred to as top dead center (TDC).

The spark actuator module 126 may be controlled by a timing signal specifying how far before or after TDC to generate the spark. Because piston position is directly related to crankshaft rotation, operation of the spark actuator module 126 may be synchronized with crankshaft angle. In various implementations, the spark actuator module 126 may halt provision of spark to deactivated cylinders.

Generating the spark may be referred to as a firing event. The spark actuator module 126 may have the ability to vary the timing of the spark for each firing event. The spark actuator module 126 may even be capable of varying the spark timing for a next firing event when the spark timing signal is changed between a last firing event and the next firing event. In various implementations, the engine 102 may include multiple cylinders and the spark actuator module 126 may vary the spark timing relative to TDC by the same amount for all cylinders in the engine 102.

During the combustion stroke, the combustion of the air/fuel mixture drives the piston down, thereby driving the crankshaft. The combustion stroke may be defined as the time between the piston reaching TDC and the time at which the piston returns to bottom dead center (BDC). During the exhaust stroke, the piston begins moving up from BDC and expels the byproducts of combustion through an exhaust valve 130. The byproducts of combustion are exhausted from the vehicle via an exhaust system 134.

The intake valve 122 may be controlled by an intake camshaft 140, while the exhaust valve 130 may be controlled by an exhaust camshaft 142. In various implementations, multiple intake camshafts (including the intake camshaft 140) may control multiple intake valves (including the intake valve 122) for the cylinder 118 and/or may control the intake valves (including the intake valve 122) of multiple banks of cylinders (including the cylinder 118). Similarly, multiple exhaust camshafts (including the exhaust camshaft 142) may control multiple exhaust valves for the cylinder 118 and/or may control exhaust valves (including the exhaust valve 130) for multiple banks of cylinders (including the cylinder 118).

The cylinder actuator module 120 may deactivate the cylinder 118 by disabling opening of the intake valve 122 and/or the exhaust valve 130. In various other implementations, the intake valve 122 and/or the exhaust valve 130 may be controlled by devices other than camshafts, such as electromagnetic actuators.

The time at which the intake valve 122 is opened may be varied with respect to piston TDC by an intake cam phaser 148. The time at which the exhaust valve 130 is opened may be varied with respect to piston TDC by an exhaust cam phaser 150. A phaser actuator module 158 may control the intake cam phaser 148 and the exhaust cam phaser 150 based on signals from the ECM 114. When implemented, variable valve lift (not shown) may also be controlled by the phaser actuator module 158.

The engine system 100 may include a boost device that provides pressurized air to the intake manifold 110. For example, FIG. 1 shows a turbocharger including a hot turbine 160-1 that is powered by hot exhaust gases flowing through the exhaust system 134. The turbocharger also includes a cold air compressor 160-2, driven by the turbine 160-1, that compresses air leading into the throttle valve 112. In various implementations, a supercharger (not shown), driven by the crankshaft, may compress air from the throttle valve 112 and deliver the compressed air to the intake manifold 110.

A wastegate 162 may allow exhaust to bypass the turbine 160-1, thereby reducing the boost (the amount of intake air compression) of the turbocharger. The ECM 114 may control the turbocharger via a boost actuator module 164. The boost actuator module 164 may modulate the boost of the turbocharger by controlling the position of the wastegate 162. In various implementations, multiple turbochargers may be controlled by the boost actuator module 164. The turbocharger may have variable geometry, which may be controlled by the boost actuator module 164.

An intercooler (not shown) may dissipate some of the heat contained in the compressed air charge, which is generated as the air is compressed. The compressed air charge may also have absorbed heat from components of the exhaust system 134. Although shown separated for purposes of illustration, the turbine 160-1 and the compressor 160-2 may be attached to each other, placing intake air in close proximity to hot exhaust.

In the example shown, the engine system 100 includes an exhaust gas recirculation (EGR) valve 170 that selectively redirects exhaust gas back to the intake manifold 110. The EGR valve 170 may be located upstream of the turbocharger's turbine 160-1. The EGR valve 170 may be controlled by an EGR actuator module 172.

The position of the crankshaft may be measured using a crankshaft position (CKP) sensor 180. The temperature of the engine coolant may be measured using an engine coolant temperature (ECT) sensor 182. The ECT sensor 182 may be located within the engine 102 or at other locations where the coolant is circulated, such as a radiator (not shown).

The pressure within the intake manifold 110 may be measured using a manifold absolute pressure (MAP) sensor 184.

In various implementations, engine vacuum, which is the difference between ambient air pressure and the pressure within the intake manifold 110, may be measured. The mass flow rate of air flowing into the intake manifold 110 may be measured using a mass air flow (MAF) sensor 186. In various implementations, the MAF sensor 186 may be located in a housing that also includes the throttle valve 112.

The throttle actuator module 116 may monitor the position of the throttle valve 112 using one or more throttle position sensors (TPS) 190. The ambient temperature of air being drawn into the engine 102 may be measured using an intake air temperature (IAT) sensor 192. The vibration of an engine block in the engine 102 may be measured using an engine block vibration (EBV) sensor 194 such as a knock sensor including piezoelectric material that outputs a voltage in proportion to vibration. In one example, the engine system 100 may include one vibration sensor for each bank of cylinders.

The ECM 114 may use signals from the sensors to make control decisions for the engine system 100. In one example, the ECM 114 detects stochastic pre-ignition based on engine vibration and adjusts engine operation when stochastic pre-ignition is detected. The ECM 114 determines a vibration intensity of each engine cycle (e.g., 720 degrees of crankshaft rotation) based on input from the EBV sensor 194. The ECM 114 may detect stochastic pre-ignition when the vibration intensity repeats a pattern of alternating between a high intensity (e.g., an intensity of knock) and a low intensity (e.g., an intensity of background vibration) a predetermined number of times (e.g., 2 times). The ECM 114 may detect stochastic pre-ignition when the vibration intensity is very high (e.g., 3 to 5 times the intensity of knock) for a single engine cycle.

Figure 2:
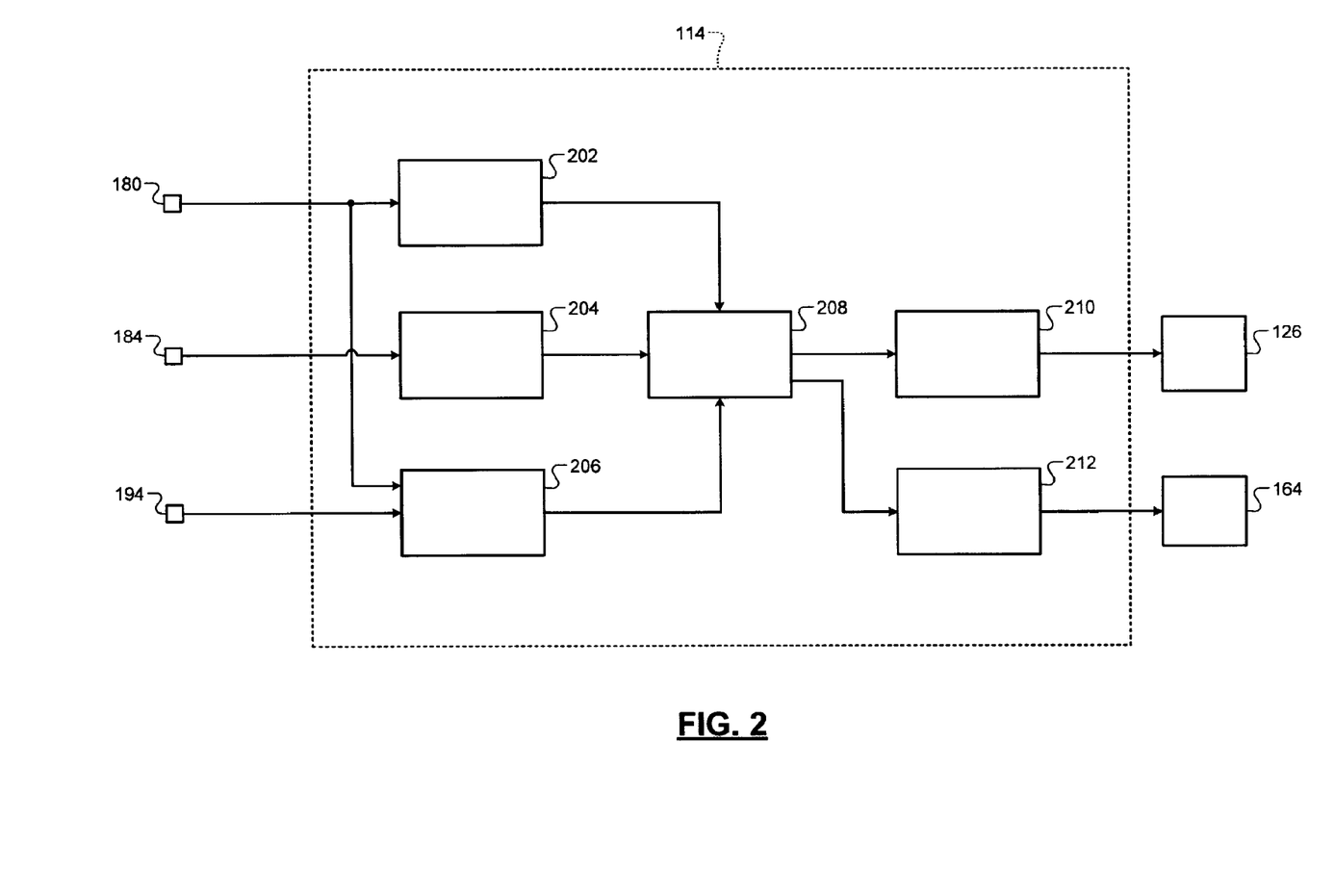
FIG. 2 is a functional block diagram of an example control system according to the principles of the present disclosure.

Referring to FIG. 2, an example implementation of the ECM 114 includes an engine speed module 202, an engine load module 204, a vibration intensity module 206, and a stochastic pre-ignition (SPI) detection module 208. The engine speed module 202 determines engine speed. The engine speed module 202 may determine the engine speed based on input from the CKP sensor 180. The engine speed module 202 may determine the engine speed based on an amount of crankshaft rotation between tooth detections and the corresponding period. The engine speed module 202 outputs the engine speed.

The engine load module 204 determines engine load. The engine load module 204 may determine the engine load based on input from the MAP sensor 184. In various implementations, the pressure within the intake manifold 110 may be used as an approximation of engine load. The engine load module 204 outputs the engine load and/or the manifold pressure.

The vibration intensity module 206 determines a vibration intensity (e.g., a single, unitless value) for each engine cycle based on input from the EBV sensor 194. In one example, the vibration intensity module 206 generates a spectral density of the input from the EBV sensor 194 using a fast Fourier transform. The vibration intensity module 206 may generate a spectral density for each cylinder based on input received from the EBV sensor 194 during a predetermined range of crankshaft rotation that includes TDC (e.g., from TDC to 70 degrees after TDC). The vibration intensity module 206 may determine when the crankshaft position corresponds to the predetermined range of crankshaft rotation based on input from the CKP sensor 180.

The vibration intensity module 206 may aggregate the spectral densities for each cylinder in the engine 102 over an engine cycle to yield a single spectral density for the engine cycle. For example, the spectral densities may include frequency bins having a predetermined width (e.g., 390 Hertz), and the vibration intensity module 206 may sum intensity values of corresponding frequency bins from the spectral densities. For each frequency bin of a spectral density, a maximum value of the frequency bin or an average value across the frequency bin may be selected and added to the maximum or average values of the corresponding frequency bin of the other spectral densities.

The vibration intensity module 206 may determine the vibration intensity of an engine cycle based on a maximum value or an average value of the spectral density for the engine cycle. For example, the vibration intensity module 206 may determine the vibration intensity of an engine cycle by determining the maximum value or the average value of the intensity values from each of the frequency bins in the spectral density. The vibration intensity module 206 outputs the vibration intensity of each engine cycle.

The SPI detection module 208 detects stochastic pre-ignition based on the vibration intensity. The SPI detection module 208 may detect stochastic pre-ignition when the vibration intensity satisfies a predetermined pattern a predetermined number of times (e.g., 2 times) consecutively. The vibration intensity may satisfy the predetermined pattern when the vibration intensity of one engine cycle is less than a first threshold (e.g., 5) and the vibration intensity of the next engine cycle is greater than a second threshold (e.g., 15). The second threshold is greater than the first threshold. A vibration intensity less than the first threshold corresponds to an intensity of normal combustion. A vibration intensity greater than the second threshold corresponds to an intensity of engine knock.

The SPI detection module 208 may detect stochastic pre-ignition when the vibration intensity of a single engine cycle is greater than a third threshold (e.g., 30). The third threshold is greater than the second threshold. A vibration intensity greater than the third threshold corresponds to an intensity that is three to five times greater than the intensity of engine knock. The SPI detection module 208 may determine the first, second, and third thresholds based on the engine speed and the engine load using, for example, a lookup table. The SPI detection module 208 may increase the first, second, and third thresholds as the engine speed and the engine load increase to prevent a false detection of stochastic pre-ignition. The SPI detection module 208 outputs a signal indicating whether stochastic pre-ignition is detected.

A spark control module 210 sends a signal the spark actuator module 126 to control spark timing of the engine 102. A boost control module 212 sends a signal the boost actuator module 164 to control boost in the engine 102. The boost control module 212 may reduce boost in the engine 102 when stochastic pre-ignition is detected. Reducing boost in the engine 102 may prevent future occurrences of stochastic pre-ignition. The spark control module 210 may advance spark timing of the engine 102 when the boost in the engine 102 is reduced to ensure that the torque output of the engine 102 satisfies a driver torque request.

Figure 3:
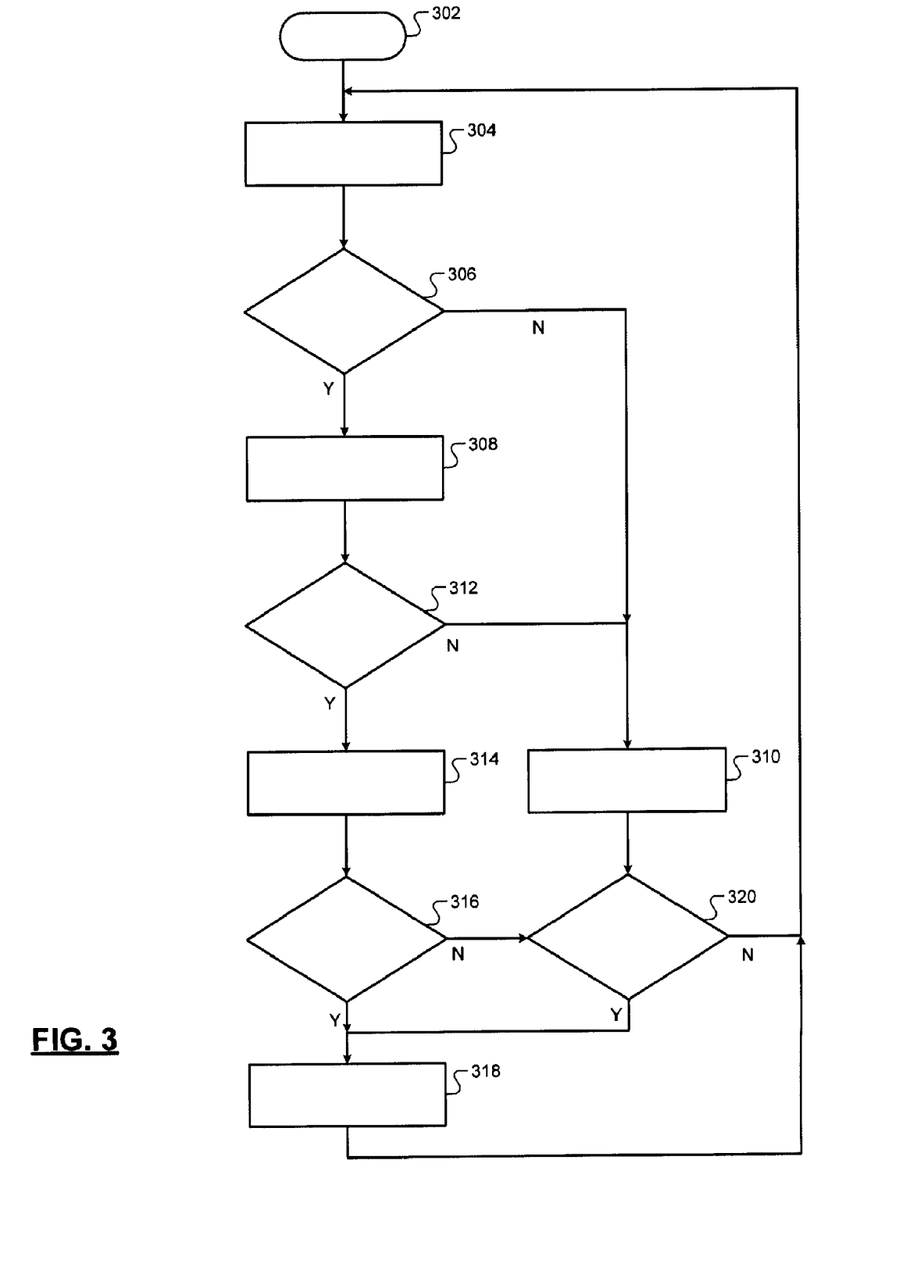
FIG. 3 is a flowchart illustrating an example control method according to the principles of the present disclosure.

Referring to FIG. 3, a method for detecting stochastic pre-ignition in an engine begins at 302. At 304, the method determines a first vibration intensity of a first engine cycle. An engine completes an engine cycle when spark is generated in each active cylinder of an engine. Thus, for a four-stroke engine, an engine cycle corresponds to 720 degrees of crankshaft rotation. A vibration intensity of an engine cycle may be a single, unitless value indicating the intensity of engine vibration during the engine cycle.

The method determines a vibration intensity of an engine cycle based on input received from a vibration sensor such as a knock sensor. In one example, the method generates a spectral density of the input from the vibration sensor using a fast Fourier transform. The method may generate a spectral density for each cylinder of an engine based on input received from the vibration sensor during a predetermined range of crankshaft rotation that includes TDC (e.g., from TDC to 70 degrees after TDC). The method may determine when a crankshaft position corresponds to the predetermined range of crankshaft rotation based on input from a crankshaft position sensor.

The method may aggregate the spectral densities for each cylinder in the engine over an engine cycle to yield a single spectral density for the engine cycle. For example, the spectral densities may include frequency bins having a predetermined width (e.g., 390 Hertz), and the method may sum intensity values of corresponding frequency bins from the spectral densities. For each frequency bin of a spectral density, a maximum value of the frequency bin or an average value across the frequency bin may be selected and added to the maximum or average values of the corresponding frequency bin of the other spectral densities.

The method may determine the vibration intensity of an engine cycle based on a maximum value or an average value of the spectral density for the engine cycle. For example, the method may determine the vibration intensity of an engine cycle by determining the maximum value or the average value of the intensity values from each of the frequency bins in the spectral density.

At 306, the method determines whether the first vibration intensity of the first engine cycle is greater than a first threshold (e.g., 5). If the first vibration intensity of the first engine cycle is greater than the first threshold, the method continues at 308. Otherwise, the method continues at 310.

At 308, the method determines a second vibration intensity of a second engine cycle. The second engine cycle is the engine cycle that immediately follows the first engine cycle. In other words, the first engine cycle and the second engine cycle are consecutive engine cycles. At 310, the method resets a pattern count. The pattern count represents the number of times that the vibration intensity satisfies a predetermined pattern.

At 312, the method determines whether the second vibration intensity of a second engine cycle is greater than a second threshold (e.g., 15). The second threshold is greater than the first threshold. If the vibration intensity of the second engine cycle is greater than the second threshold, the method continues at 314. Otherwise, the method continues at 310.

At 314, the method increments the pattern count (e.g., increases the pattern count by one). At 316, the method determines whether the pattern count is greater than or equal to a predetermined number (e.g., two). If the pattern count is greater than or equal to the predetermined number, the method continues at 318. Otherwise, the method continues at 320.

At 318, the method detects stochastic pre-ignition. The method may reduce boost in the engine when stochastic pre-ignition is detected to prevent future occurrences of stochastic pre-ignition. The method may advance spark timing of the engine when the boost in the engine is reduced to ensure that the torque output of the engine satisfies a driver torque request.

At 320, the method determines whether a vibration intensity (e.g., the first or second vibration intensity) is greater than a third threshold (e.g., 30). The third threshold is greater than the second threshold. The method may determine the first, second, and third thresholds based on the engine speed and the engine load using, for example, a lookup table. The method may increase the first, second, and third thresholds as the engine speed and the engine load increase to prevent a false detection of stochastic pre-ignition. If the vibration intensity is greater than the third threshold, the method continues at 318. Otherwise, the method continues at 304.

Figure 4:
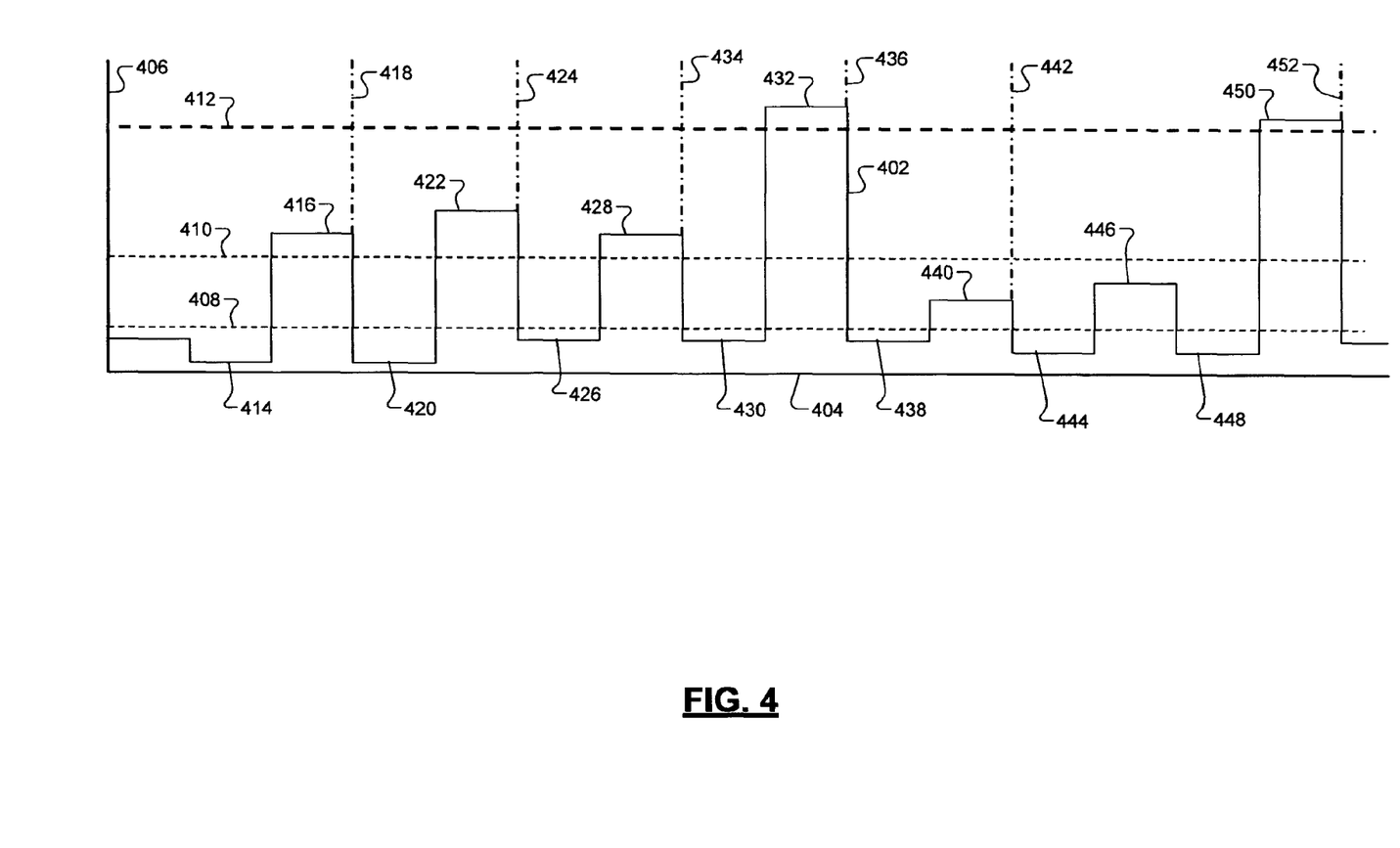
FIG. 4 is a graph illustrating example patterns of engine vibration for detecting stochastic pre-ignition according to the principles of the present disclosure.

Referring to FIG. 4, a vibration intensity signal 402 is plotted with respect to an x-axis 404 that represents time and a y-axis 406 that represents vibration intensity. Each horizontal section of the vibration intensity signal 402 corresponds to one engine cycle. A system and method according to the present disclosure detects stochastic pre-ignition in an engine based on the vibration intensity signal 402.

Stochastic pre-ignition may be detected when the vibration intensity signal 402 satisfies a predetermined pattern a predetermined number of times (e.g., 2 times) consecutively. The predetermined pattern may be satisfied when the vibration intensity signal 402 is less than a first threshold 408 (e.g., 5) for one engine cycle and greater than a second threshold 410 (e.g., 30) for the next engine cycle. A vibration intensity less than the first threshold 408 corresponds to a vibration intensity of normal combustion. A vibration intensity greater than the second threshold 410 and less than the third threshold 412 corresponds to a vibration intensity of engine knock.

For example, the vibration intensity signal 402 is less than the first threshold 408 for an engine cycle 414 and greater than the second threshold 410 for an engine cycle 416. Thus, at 418, the system and method increases a pattern count from zero to one. Similarly, the vibration intensity signal 402 is less than the first threshold 408 for an engine cycle 420 and greater than the second threshold 410 for an engine cycle 422. Thus, at 424, the pattern count is increased to two, and the system and method may generate a signal indicating that stochastic pre-ignition (SPI) is detected. The vibration intensity signal 402 for engine cycles 426, 428, 430, and 432 continues to satisfy the predetermined pattern. Thus, the pattern count is increased to three at 434 and to four at 436, and the system and method may continue to generate the SPI detection signal.

After 436, the vibration intensity signal 420 stops satisfying the predetermined pattern. The vibration intensity signal 402 is less than the first threshold 408 for an engine cycle 438, which satisfies the predetermined pattern. However, the vibration intensity signal 402 is less than the second threshold 410 for an engine cycle 440, which does not satisfy the predetermined pattern. Thus, at 442, the pattern count may be reset, and the system and method may stop generating the SPI detection signal.

The vibration intensity signal 402 for the engine cycles 444, 446, 448, and 450, does not satisfy the predetermined pattern. However, the vibration intensity signal 402 is greater than the third threshold 412 for the engine cycle 450. Thus, at 452, the system and method may generate the SPI detection signal and continue generating the SPI detection signal until the vibration intensity signal 402 is less than the third threshold 412.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

In this application, including the definitions below, the term module may be replaced with the term circuit. The term module may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term code, as used above, may include software, firmware, and/or microcode, and may refer to programs, routines, functions, classes, and/or objects. The term shared processor encompasses a single processor that executes some or all code from multiple modules. The term group processor encompasses a processor that, in combination with additional processors, executes some or all code from one or more modules. The term shared memory encompasses a single memory that stores some or all code from multiple modules. The term group memory encompasses a memory that, in combination with additional memories, stores some or all code from one or more modules. The term memory may be a subset of the term computer-readable medium. The term computer-readable medium does not encompass transitory electrical and electromagnetic signals propagating through a medium, and may therefore be considered tangible and non-transitory. Non-limiting examples of a non-transitory tangible computer readable medium include nonvolatile memory, volatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

What is claimed is:

1. A system comprising:
    a vibration intensity module that determines a vibration intensity of an engine over a first engine cycle and a second engine cycle, wherein the first engine cycle and the second engine cycle each correspond to a predetermined amount of crankshaft rotation; and
    a stochastic pre-ignition (SPI) detection module that selectively detects stochastic pre-ignition when the vibration intensity of the first engine cycle is less than a first threshold and the vibration intensity of the second engine cycle is greater than a second threshold.

2. The system of claim 1 wherein:
    the vibration intensity module determines the vibration intensity of the engine over a third engine cycle and a fourth engine cycle, wherein the third engine cycle and the fourth engine cycle each correspond to the predetermined amount of crankshaft rotation; and
    the SPI detection module detects stochastic pre-ignition when the vibration intensity of the third engine cycle is less than the first threshold and the vibration intensity of the fourth engine cycle is greater than the second threshold.

3. The system of claim 2 wherein the first engine cycle, the second engine cycle, the third engine cycle, and the fourth engine cycle are consecutive engine cycles.

4. The system of claim 2 wherein the second threshold is greater than the first threshold.

5. The system of claim 4 wherein:
    the SPI detection module detects stochastic pre-ignition when the vibration intensity is greater than a third threshold; and
    the third threshold is greater than the second threshold.

6. The system of claim 5 wherein the SPI detection module determines the first threshold, the second threshold, and the third threshold based on engine speed and engine knock.

7. The system of claim 1 wherein the vibration intensity module determines the vibration intensity based on input received from a vibration sensor.

8. The system of claim 7 wherein the vibration intensity module:
    generates a spectral density for each cylinder of the engine;
    sums the spectral densities of each cylinder in the engine to yield a spectral density for the engine cycle; and
    determines the vibration intensity based on the spectral density for the engine cycle.

9. The system of claim 8 wherein the vibration intensity module generates a spectral density for each cylinder of the engine based on the vibration sensor input during a predetermined range of crankshaft rotation.

10. The system of claim 1 further comprising a boost control module that reduces boost in the engine when stochastic pre-ignition is detected.

11. A method comprising:
    determining a vibration intensity of an engine over a first engine cycle and a second engine cycle, wherein the first engine cycle and the second engine cycle each correspond to a predetermined amount of crankshaft rotation; and
    selectively detecting stochastic pre-ignition when the vibration intensity of the first engine cycle is less than a first threshold and the vibration intensity of the second engine cycle is greater than a second threshold.

12. The method of claim 11 further comprising:
    determining the vibration intensity of the engine over a third engine cycle and a fourth engine cycle, wherein the third engine cycle and the fourth engine cycle each correspond to the predetermined amount of crankshaft rotation; and
    detecting stochastic pre-ignition when the vibration intensity of the third engine cycle is less than the first threshold and the vibration intensity of the fourth engine cycle is greater than the second threshold.

13. The method of claim 12 wherein the first engine cycle, the second engine cycle, the third engine cycle, and the fourth engine cycle are consecutive engine cycles.

14. The method of claim 12 wherein the second threshold is greater than the first threshold.

15. The method of claim 14 further comprising detecting stochastic pre-ignition when the vibration intensity is greater than a third threshold, wherein the third threshold is greater than the second threshold.

16. The method of claim 15 further comprising determining the first threshold, the second threshold, and the third threshold based on engine speed and engine knock.

17. The method of claim 11 further comprising determining the vibration intensity based on input received from a vibration sensor.

18. The method of claim 17 further comprising:
    generating a spectral density for each cylinder of the engine;
    summing the spectral densities of each cylinder in the engine to yield a spectral density for the engine cycle; and
    determining the vibration intensity based on the spectral density for the engine cycle.

19. The method of claim 18 further comprising generating a spectral density for each cylinder of the engine based on the vibration sensor input during a predetermined range of crankshaft rotation.

20. The method of claim 11 further comprising reducing boost in the engine when stochastic pre-ignition is detected.

* * * * *